Patented Sept. 19, 1933

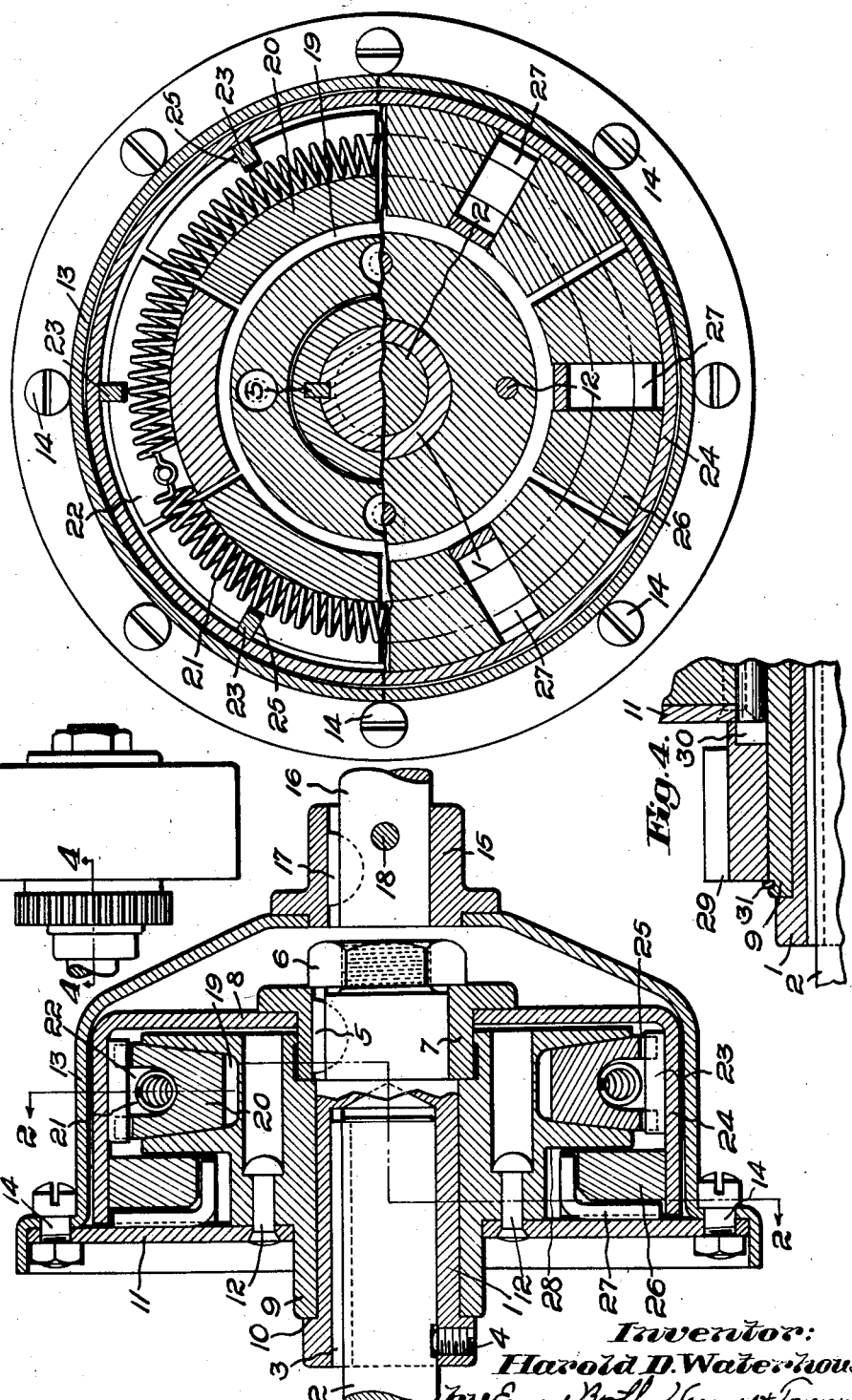

1,927,509

UNITED STATES PATENT OFFICE 1,927,509

SAFETY CLUTCH MECHANISM

Harold D. Waterhouse, Rochester, N. Y.

Application March 9, 1932. Serial No. 597,720

12 Claims. (Cl. 192—103)

My invention aims to provide improvements in safety drive mechanisms.

In the drawing which illustrates preferred embodiments of my invention:—

Figure 1 is a vertical section showing one form of device involving my invention;

Fig. 2 is a section taken on the line 2—2 of Figure 1 and shows part of each of the clutch mechanisms;

Fig. 3 is an elevation view of a device similar to that shown in Figure 1, the difference being in the arrangement for power take-off; and Fig. 4 is an enlarged sectional view taken on the line 4—4 of Fig. 3.

My invention as illustrated by the drawing relates to devices for automatic load release which are particularly adapted for use in connection with the driving of machines. My improved devices are especially useful for insertion between the main drive shaft of a machine and the drive shaft of an electric motor, because it provides a safety mechanism to prevent injury to the motor and the machine in the event that the machine becomes overloaded or jammed.

Referring now to the particular embodiment of my invention illustrated by Figs. 1 and 2, I have shown a hollow stub shaft 1 which is adapted to slip over the end of the motor shaft 2 (Figure 1) and is held against rotation by means of a key 3 or a set screw 4 or both, as illustrated. On that end of the shaft 1 opposite the end where the shaft of the motor enters there is secured by means of a key 5 and a nut 6 a flanged collar 7 for rotation with the shaft 1. The flange of the collar 7 is welded or otherwise secured to the bottom 8 of a cup-shaped member so that the cup-shaped member may rotate about the axis of the shaft 1. Thus far I have described what may be termed the driving means of the device.

The driven means of the device comprises a part 9 surrounding the shaft 1 and held against longitudinal movement by means of the shoulder 10 and the flanged collar 7, as best illustrated in Figure 1. This part 9 is freely rotatable relative to the shaft 1. A disk 11 is secured by means of rivets 12 to the part 9 for rotation therewith and a casing 13 surrounding a large part of the mechanism is secured as by bolts 14 to the disk 11. This casing 13 has a hub 15 welded or otherwise secured thereto for rotation therewith and is adapted to receive the driven shaft 16 of the machine to be driven by the motor. The shaft 16 may be secured against rotation to the hub 15 by a key 17 and if necessary a pin 18, all of which is clearly illustrated in Figure 1. All of the mechanism just described may be termed the driven means.

A clutch mechanism operable to produce rotation of the driven means upon rotation of the driving means is interposed between the cup-shaped member and the part 9. The particular clutch mechanism illustrated comprises an inwardly tapering channel 19 provided by the part 9, a plurality of segments 20 fitted into the channel 19 and normally pressed into engagement therewith by a garter spring 21 fitted into grooves 22 formed in the outer edges of the segments 20 and interengaging means for rotation of the segments 20. The interengaging means comprise for each segment a bar 23 welded to the side wall 24 of the cup-shaped member and fitted into a longitudinal groove 25 formed in the segment. These bars 23 and grooves 25 form interlocking means to prevent relative rotation between the segments and the cup-shaped member, while at the same time permitting a limited radial movement of each of the segments 20.

A second clutch mechanism which is of the centrifugally operative type is interposed between the driving and driven means and is particularly associated with the part 9, the disk 11 and the annular wall 24 of the cup-shaped part. This clutch mechanism comprises a plurality of segments 26 which are slidably keyed and guided by L-shaped members 27 attached to the inner face of the disk 11, as best illustrated in Figure 1. The segments 26 are guided between the inner face of the disk 11 and the wall 28 provided by the part 9. The movement of these segments radially is limited by the wall 24 of the cup-shaped member and the bottom portions of the L-shaped members 27.

During the operation of my improved device the action of the parts takes place in the following manner:—The motor is started, thereby rotating the shaft 2 which in turn rotates the shaft 1 and the cup-shaped member. This action causes the starting clutch, which is somewhat in the nature of a cone clutch, to rotate the part 9, thereby transmitting motion to the shaft 16 so that operation of the machine is begun. During the operation of the starting clutch the garter spring 21 produces a force required to produce the required torque to permit the device to be driven by the starting clutch until the motor reaches nearly to full speed. The weight of the segments in combination with the pressure of the spring is such that centrifugal force will act to release the segments 20 at or about the time that the driving means reaches a predetermined speed of rotation.

During the time that the starting clutch is operating it is, of course, obvious that the segments 26 of the service clutch have been rotating. Since the service clutch operates entirely by centrifugal force, it will be understood that the members 26 begin to grip the inner surface of the wall 24 of the cup member from the time that the motor is first started. This gripping action increases with the speed of rotation of the device so that at the time the starting clutch goes out of operation the service clutch comes into full operation and continues to operate so long as the speed of the motor is maintained at such a rate that the starting clutch is maintained out of operating engagement.

The advantages of my device will be readily understood when the facts regarding the torque, speed and overload are taken into consideration. Modern "squirrel cage" motors are usually capable of delivering a torque equal to as much as three hundred per cent of the horse power rating the instant the electrical energy is applied to the motor. Therefore, there is almost instant starting and in order that the driven machine may be operated properly a safety device must be so constructed that it will take care of the excessive overload until the motor reaches the desired speed. It is desirable to have the drive then change to one capable of delivering only a small percentage of torque in excess of the rated horse power of the motor. This is desirable for safety of the driven machine as well as the motor.

In my device as described above there are two clutches, one carried by the driving means and the other carried by the driven means and both acting oppositely. That is to say that the starting clutch operates as the motor gets under way and then tends to go out of operation while the service clutch is going into operation. In this manner the load is transferred from the starting to the service clutch and safety is fully obtained. The safety feature of my device will be readily understood by those skilled in the art because of the fact that centrifugal force gains or loses with the square of the speed of rotation of the device. Therefore, when the driven machine meets with abnormal resistance to rotation the service clutch slips and loses speed. Since a relatively small loss of speed results in substantial loss of clutching effect the drive between the motor and the driven machine is immediataely disconnected. To start the operation of the machine it is merely necessary to stop and restart the motor whereby the device will function in the same manner to start the machine as already described.

In some instances it may be desirable to connect my improved device to a driven machine through gearing and, therefore, in Figs. 3 and 4 I have shown a device adapted for that purpose. In the construction illustrated in Figs. 3 and 4 there is illustrated a gear 29 surrounding the part 9 and also the shaft 1 and secured for rotation as a part of the driven means by a pin 30 passing through the disk 11 and engaging the gear. The gear 29 may be held against axial movement by means of a split ring (Fig. 4) or in any other suitable manner. With this arrangement power is put into and taken out of the revice at the same side of the mechanism, as clearly illustrated in Fig. 3.

While I have illustrated and described preferred embodiments of my invention, I do not wish to be limited thereby, because the scope of my invention is best defined by the following claims.

1. A device of the class described comprising, in combination, a driving member, a driven member and two independently operating clutch mechanisms operatively interposed between the driving and driven members, one of said mechanisms being effective at driving member starting speeds and including means responsive to the driving member speed making it ineffective at normal driving member speeds, and the other of said mechanisms being ineffective at driven member starting speeds and including means responsive to the driven member speed making it effective at normal driven member speeds.

2. A device of the class described comprising, in combination, a driving member, a driven member and two independently operating clutch mechanisms operatively interposed between the driving and driven members, one of said clutch mechanisms being constructed and arranged to be engaged with the driven member up to a predetermined speed of the driving member and beyond that speed to be disengaged by centrifugal force and said other clutch mechanism being constructed and arranged to be engaged with said driving member for driving the driven member only after a predetermined speed of rotation of the driven member has been reached.

3. A device of the class described comprising, in combination, a driving member, a driven member and two independently operating clutch mechanisms operatively interposed between the driving and driven members, one of said clutch mechanisms being constructed and arranged to be engaged with the driven member up to a predetermined speed of the driving member and beyond that speed to be disengaged by centrifugal force and said other clutch mechanism being constructed and arranged to be engaged with said driving member for driving the driven member only after a predetermined speed of rotation of the driven member has been reached, said first mentioned clutch mechanism including a series of segments normally spring-pressed into operation and said other clutch mechanism comprising only a series of centrifugally operative segments.

4. A device of the class described comprising, in combination, a driving member, a driven member and two independently operating clutch mechanisms operatively interposed between the driving and driven members, one of said clutch mechanisms being of the cone type which includes an inwardly tapering channel carried by the driven member, a series of circularly arranged segments fitted into said channel, spring means normally pressing said segments into driving engagement with said channel, interlocking means cooperating between the driving member and the segments for positive rotation of the segments and said other clutch mechanism comprising a series of centrifugally operative segments.

5. A device of the class described comprising, in combination, a driving member, a driven member and two independently operating clutch mechanisms operatively interposed between the driving and driven members, one of said clutch mechanisms being of the cone type which includes an inwardly tapering channel carried by the driven member, a series of circularly arranged segments fitted into said channel, spring means normally pressing said segments into driving engagement with said channel, interlocking means cooperating between the driving member and the segments for positive rotation of the segments, means providing lost motion connections between the elements of the interlocking means whereby the segments may be permitted to move radially for disengagement from the channel, and said other clutch mechanism comprising a series of centrifugally operative segments.

6. A device of the class described comprising, in combination, a driving member, a driven member and two independently operating clutch mechanisms operatively interposed between the driving and driven members, one of said clutch mechanisms being constructed and arranged to be engaged with the driven member up to a predetermined speed of the driving member and beyond that speed to be disengaged by centrifugal force, and said other clutch mechanism being constructed and arranged to be engaged with said driving member for driving the driven member only after a predetermined speed of rotation of the driven member has been reached, said first mentioned clutch mechanism including a series of segments normally spring-pressed into operation and said other clutch mechanism comprising a clutch surface presented by the driving member and a series of centrifugally operative segments carried by the driven member.

7. A device of the class described comprising, in combination, a driving member, a driven member and two independently operating clutch mechanisms operatively interposed between the driving and driven members, one of said clutch mechanisms being of the cone type which includes an inwardly tapering channel carried by the driven member, a series of circularly arranged segments fitted into said channel, spring means normally pressing said segments into driving engagement with said channel, interlocking means cooperating between the driving member and the segments for positive rotation of the segments, and said other clutch mechanism comprising a clutch surface presented by the driving member and a series of centrifugally operative segments carried by the driven member.

8. A device of the class described comprising, in combination, a driving means, a driven means, a spring-pressed clutch mechanism interposed between the driving and driven means and including an inwardly tapering circular channel carried by the driven means, a series of segments having tapered sides and fitting into the channel, a circularly arranged spring pressing said segments into driving engagement with said channel, and driving connections between said segments and said driving means for positive rotation of said segments, a second clutch mechanism comprising a clutch surface presented by the driving means, a series of centrifugally operative segments and segment guiding and driving means carried by said driven means for positive rotation of said segments when said driven means is rotated by said first described clutch mechanism and said clutch mechanisms being operable as and for the purposes illustrated and described.

9. A device of the class described comprising, in combination, a driving member, a driven member and two independently operating clutch mechanisms operatively interposed between the driving and driven members, one of said clutch mechanisms being constructed and arranged to be engaged with the driven member up to a predetermined speed of the driving member and beyond that speed to be disengaged by centrifugal force, and said other clutch mechanism being constructed and arranged to be engaged with said driving member for driving the driven member only after a predetermined speed of rotation of the driven member has been reached, said first mentioned clutch mechanism being of the spring-pressed cone type and said other clutch mechanism being of the centrifugally operative type.

10. A device of the class described, comprising in combination, a driving member, a driven member and member coupling means effective to transmit a starting torque while said members are operating in a starting speed range and to transmit a maximum normal load torque smaller than said starting torque while said members are operating at higher speeds and permitting said driven member to stop without reducing the driving member speed to said starting range when the torque required to keep the driven member in operation at said higher speeds exceeds said maximum normal load torque, said means comprising a clutch mechanism including centrifugal force means responsive to the speed of said driving member and reducing the torque transmitting capacity of said mechanism as the driving member speed increases, and a second clutch mechanism including centrifugal force means responsive to the speed of the driven member increasing and decreasing the torque transmitting capacity of the last mentioned mechanism as the speed of the driven member increases and decreases.

11. A device of the class described, comprising in combination, a driving member, a driven member and member coupling means effective to transmit a starting torque while said members are operating in a starting speed range and to transmit a maximum normal load torque smaller than said starting torque while said members are operating at higher speeds and permitting said driven member to stop without reducing the driving member speed to said starting range when the torque required to keep the driven member in operation at said higher speeds exceeds said maximum normal load torque, said means comprising a clutch mechanism including centrifugal force means responsive to the speed of said driving member and depriving the last mentioned mechanism of torque transmitting capacity when the driving member speed is above said range, and a second clutch mechanism including centrifugal force means responsive to the speed of the driven member and increasing and decreasing the torque transmitting capacity of the last mentioned mechanism as the speed of the driven member increases and decreases.

12. A device of the class described comprising, in combination, a driving member, a driven member and two independently operating clutch mechanisms operatively interposed between the driving and driven members, one of said clutch mechanisms comprising a bearing surface carried by the driven member and a set of radially movable segments interlocked with the driving element for continuous rotation with the latter and spring means holding said segments in frictional driving engagement with said bearing surface up to a predetermined speed of the driving member and beyond that speed yielding to permit said segments to be disengaged from said surface by centrifugal force, and said other clutch mechanism being constructed and arranged to be engaged with said driving member for driving the driven member only after a predetermined speed of rotation of the driven member has been reached.

HAROLD D. WATERHOUSE.